(12) United States Patent
Ruger

(10) Patent No.: US 11,547,064 B2
(45) Date of Patent: Jan. 10, 2023

(54) DEVICE FOR GROWING PLANTS ABOVE A SELECTED SURFACE

(71) Applicant: David K. Ruger, New Paltz, NY (US)

(72) Inventor: David K. Ruger, New Paltz, NY (US)

( * ) Notice: Subject to any disclaimer, the term of this patent is extended or adjusted under 35 U.S.C. 154(b) by 0 days.

(21) Appl. No.: 17/242,280

(22) Filed: Apr. 27, 2021

(65) Prior Publication Data

US 2022/0338424 A1    Oct. 27, 2022

(51) Int. Cl.
  *A01G 13/02*   (2006.01)
  *A01G 25/02*   (2006.01)
  *A01G 13/10*   (2006.01)

(52) U.S. Cl.
  CPC ..... *A01G 13/0256* (2013.01); *A01G 13/0206* (2013.01); *A01G 13/0231* (2013.01); *A01G 13/105* (2013.01); *A01G 25/02* (2013.01)

(58) Field of Classification Search
  CPC ........... A01G 13/0206; A01G 13/0231; A01G 13/0256; A01G 13/105; A01G 25/02; A01G 9/026
  USPC .......................................... 47/31, 31.1, 21.1
  See application file for complete search history.

(56) References Cited

U.S. PATENT DOCUMENTS

| | | | | |
|---|---|---|---|---|
| 2,015,471 A * | 9/1935 | Genuit | ............... | A01G 13/0231 47/29.5 |
| 2,688,822 A * | 9/1954 | King | .................... | A01G 13/043 47/29.6 |
| 2,807,912 A * | 10/1957 | Bjorksten | .............. | A01G 31/02 47/29.1 |
| 2,832,178 A * | 4/1958 | Arthurs | ................ | A01G 13/043 47/29.1 |
| 4,665,646 A * | 5/1987 | Anderson | .......... | A01G 13/0231 47/21.1 |
| 5,241,783 A * | 9/1993 | Krueger | ................. | A01G 9/026 47/78 |

(Continued)

FOREIGN PATENT DOCUMENTS

| | | | | |
|---|---|---|---|---|
| CA | 2624386 A1 * | 9/2009 | ......... | A01G 13/0256 |
| DE | 4222009 A1 * | 1/1994 | ......... | A01G 13/0231 |

(Continued)

OTHER PUBLICATIONS

English-language translation of DE 4232525 A1 (Year: 1994).*

*Primary Examiner* — Joshua D Huson
*Assistant Examiner* — Alanna K Peterson
(74) *Attorney, Agent, or Firm* — Donald G. Flaynik

(57) ABSTRACT

A device for growing plants above a selected surface includes a bottom member disposed upon a selected surface; a top member disposed upon and secured to said bottom member via two longitudinal securing seams, whereby, said top member includes two outer longitudinal flap portions and a longitudinal center portion, which ultimately receives a growing material in which plants and/or seeds are disposed. The longitudinal flap portions are ultimately folded above the growing material whereby longitudinal edge portions of the flap portions are separated a predetermined distance for allowing water and light to engage the growing material. Pipe members are removably secured to longitudinal edge portions of each longitudinal side of the bottom member, thereby enabling the manual lifting and transport of the device for disposal upon a selected surface.

20 Claims, 6 Drawing Sheets

(56) References Cited

U.S. PATENT DOCUMENTS

| | | | | |
|---|---|---|---|---|
| 5,913,477 | A * | 6/1999 | Dean | A01G 25/02 |
| | | | | 239/289 |
| 9,326,456 | B2 * | 5/2016 | Wright | A01G 27/008 |
| 9,681,609 | B2 * | 6/2017 | Kaminski | A01G 25/02 |
| 2016/0227756 | A1 * | 8/2016 | Hawkinson | A01G 13/02 |
| 2017/0238475 | A1 * | 8/2017 | Van Pelt | A01G 9/28 |
| 2019/0116742 | A1 * | 4/2019 | Denton | B05B 15/625 |
| 2019/0183073 | A1 * | 6/2019 | Perry, Jr. | A01G 2/00 |

FOREIGN PATENT DOCUMENTS

| | | | | | |
|---|---|---|---|---|---|
| DE | 4232525 | A1 * | 3/1994 | | A01G 9/026 |
| EP | 3351090 | A1 * | 7/2018 | | A01G 9/026 |
| EP | 3238529 | B1 * | 3/2019 | | A01G 13/0231 |
| FR | 2130999 | A5 * | 11/2019 | | |
| GB | 2402859 | A * | 12/2004 | | A01G 13/0231 |
| WO | WO-8400467 | A1 * | 11/2009 | | |

* cited by examiner

DEVICE FOR GROWING PLANTS ABOVE A SELECTED SURFACE

BACKGROUND OF THE INVENTION

1. Field of the Invention

The present invention generally relates to gardens grown above ground or inside buildings using pots and other containers that allow plant roots to be watered, whereby excess water is drained from the plant roots to a bottom portion of the container thereby preventing root rot.

The present invention provides a device for growing relatively large quantities of plants above a selected surface, including but not limited to soil, wood and concrete. The device includes an elongated section of deformable material that ultimately receives a growing material manually disposed upon a midportion of the deformable material. The device includes pipe members detachably joined to longitudinal sides of the deformable material for stabilizing and lifting the deformable material with the growing material and plants therein. The device further includes a support member that is detachably secured to the pipe members, and a guard member that is detachably secured to the support member, whereby, birds and insects are prevented from engaging the plants and/or seeds disposed in the growing material; and water and sunlight are allowed to engage the plants and/or seeds.

2. Background of the Prior Art

Prior art flower pots and plant containers are manually lifted and transported to a selected site or surface upon which the pots and/or containers are manually disposed. The pots and containers are manufactured in a variety of sizes and configurations with relatively few plants or seeds inserted into dirt or similar growing material disposed in the containers. Alternatively, plants are inserted in growing materials disposed in relatively large permanent structures connected to or part of a building used as a residence, commercial office or manufacturing facility.

There is a need for a device for growing plants above ground that includes relatively large longitudinal dimensions capable of forming relatively long rows of plants. Further, there is a need for the device to be manually elevated and transported when growing material containing plants is disposed on the device. There is a need for pipe members of the device to serve as handles and as a support base for orientating deformable members that support growing material with plants. There is a need for the pipe members to detachably receive a support member, which removably receives a guard member for isolating flowers and plants from birds and insects. There is a need for the pipe members and the guard member to be cooperatively coupled for delivering water to the growing material when water is supplied to the pipe members.

SUMMARY OF THE INVENTION

It is an object of the present invention to overcome many of the disadvantages associated with prior art devices for growing plants above a selected surface. A principal object of the present invention is to provide a device that is relatively large and capable of receiving and holding a growing material upon a selected surface. Another principal object of the present invention is to provide a device that ultimately receives multiple seeds and/or plants in the growing material, and that prevents insects and birds from engaging the plants and/or seeds disposed in the growing material. A feature of the device is a top member secured to a bottom member having substantially the same configuration and dimensions as the top member. Another feature of the device is that the top member, after being longitudinally secured to the bottom member, includes two outer longitudinal flap portions and a longitudinal center portion. An advantage of the device is that each of the two outer longitudinal flap portions and longitudinal center portion have substantially the same configuration and dimensions. Another advantage of the device is that the outer flap portions of the top member are foldable after growing material is disposed upon center portion of the top member, whereby, the growing material is captured within the top member after opposing edge portions of the flap securing portions are detachably secured together. Still another advantage of the device is that the opposing edge portions of the flap securing portions are separated a distance that enables light and moisture to engage the captured and exposed growing material, thereby promoting the growth of the seeds and/or plants.

Another object of the present invention is to provide pipe members are detachably secured to the bottom member of the device. A feature of the device is pipe pouches formed in each longitudinal edge of the bottom member of the device. An advantage of the device is that a pipe member is slidably inserted into each pipe pouch, and slidably removed from each pipe pouch, thereby providing a solid structure for maintaining the longitudinal dimension of the device when a deformably material is used to fabricate the bottom and top members. Another advantage of the device is that the pipe members promote the manual lifting and transport of the device for ultimately disposing the device upon a selected surface.

Still another advantage of the device is to provide a support member that detachably secures to the pipe members after the predetermined plants and/or seeds are disposed in the growing material. A feature of the device is to configure and dimension the support member to detachably receive a guard member. An advantage of the device is that the support and guard members cooperate to prevent insects and birds from engaging the plants and/or seeds disposed in the growing material. Another advantage of the device is that the guard member can be fabricated from materials that allow sunlight and/or moisture to engage the plants and seeds in the growing material.

Yet another advantage of the device is to provide water to the growing material disposed in the top member. A feature of the device is multiple water apertures disposed in the support member, which is fabricated from pipes relatively smaller in diameter than the pipe members, whereby each water aperture directs water into a predetermined area of the growing material. Another feature of the device is connecting the support member to the pipe members, whereby, water supplied to the pipe members, via a single hose, flows through the pipe members and into the support member. An advantage of the device is that water at a relatively low pressure is directed upon the exposed growing material, thereby irrigating the growing material.

Another advantage of the device is to provide equipment for automatically controlling water flow to the growing material. A feature of the device is a combination timer and valve member detachably secured to both a water hose and an end of one of the pipe members. Another feature of the device is a battery for energizing the timer-valve combination when a relatively long time period of water flow is required, and/or the time period of operation must be controlled from the internet. An advantage of the device is that water flow can be controlled when manual oversight is not available.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 1:
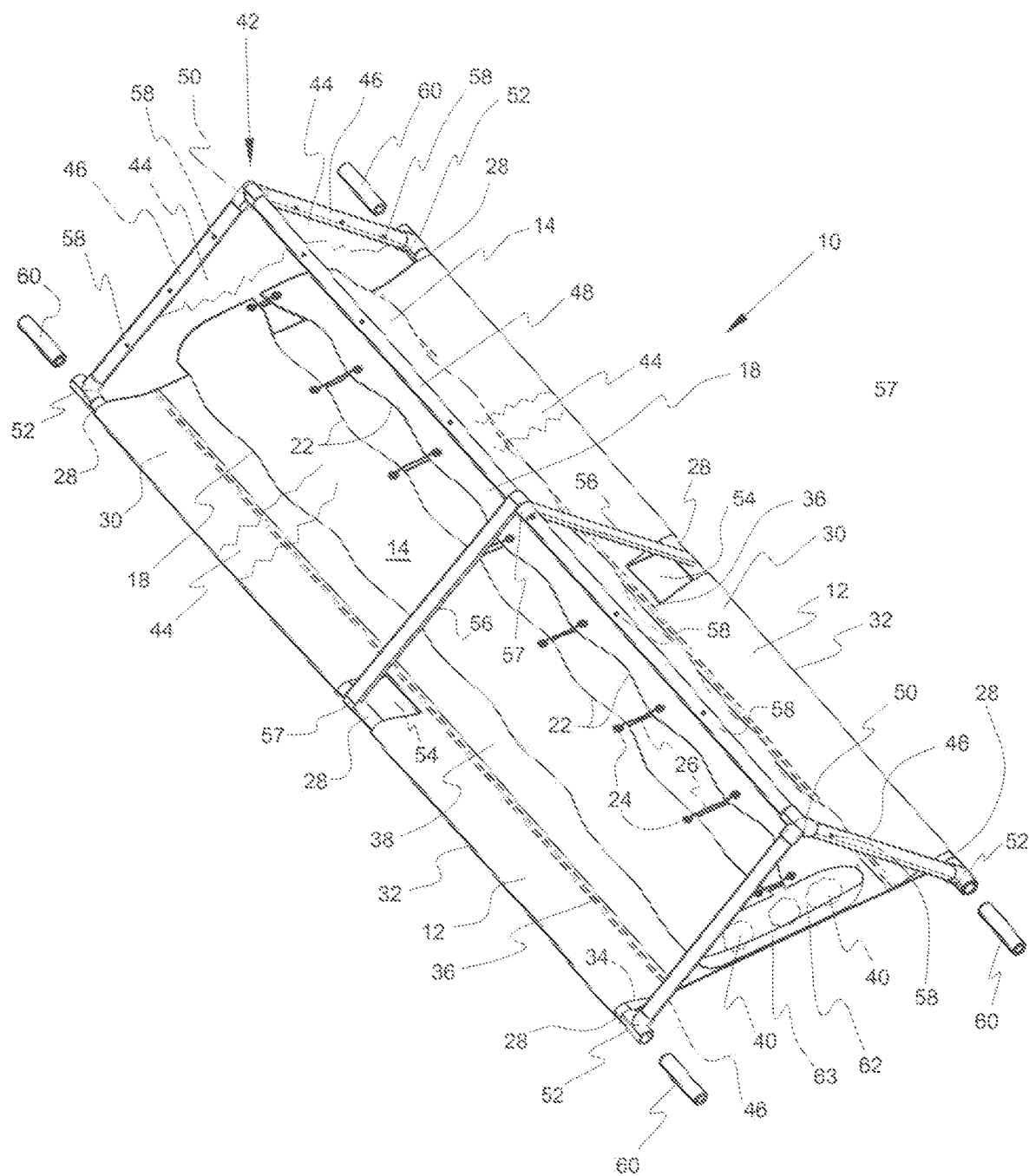
FIG. 1 is a top perspective view of a device for growing plants above a selected surface with a growing material disposed upon a top member of the device, the top member depicted with folded flap portions securing the position of the growing material in accordance with the present invention.
Figure 2:
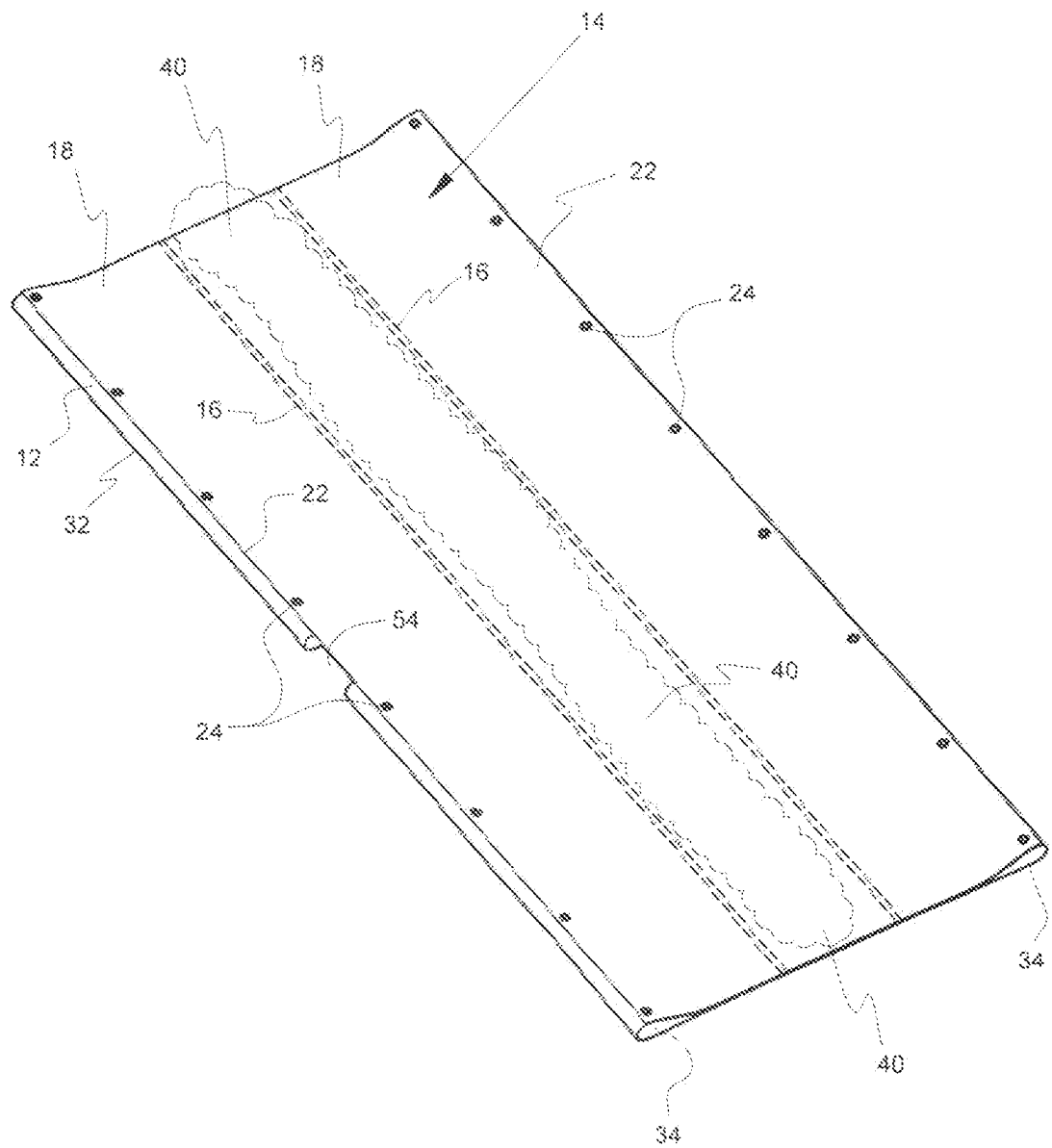
FIG. 2 is a top perspective view of a top member disposed upon a bottom member of the device.
Figure 3:
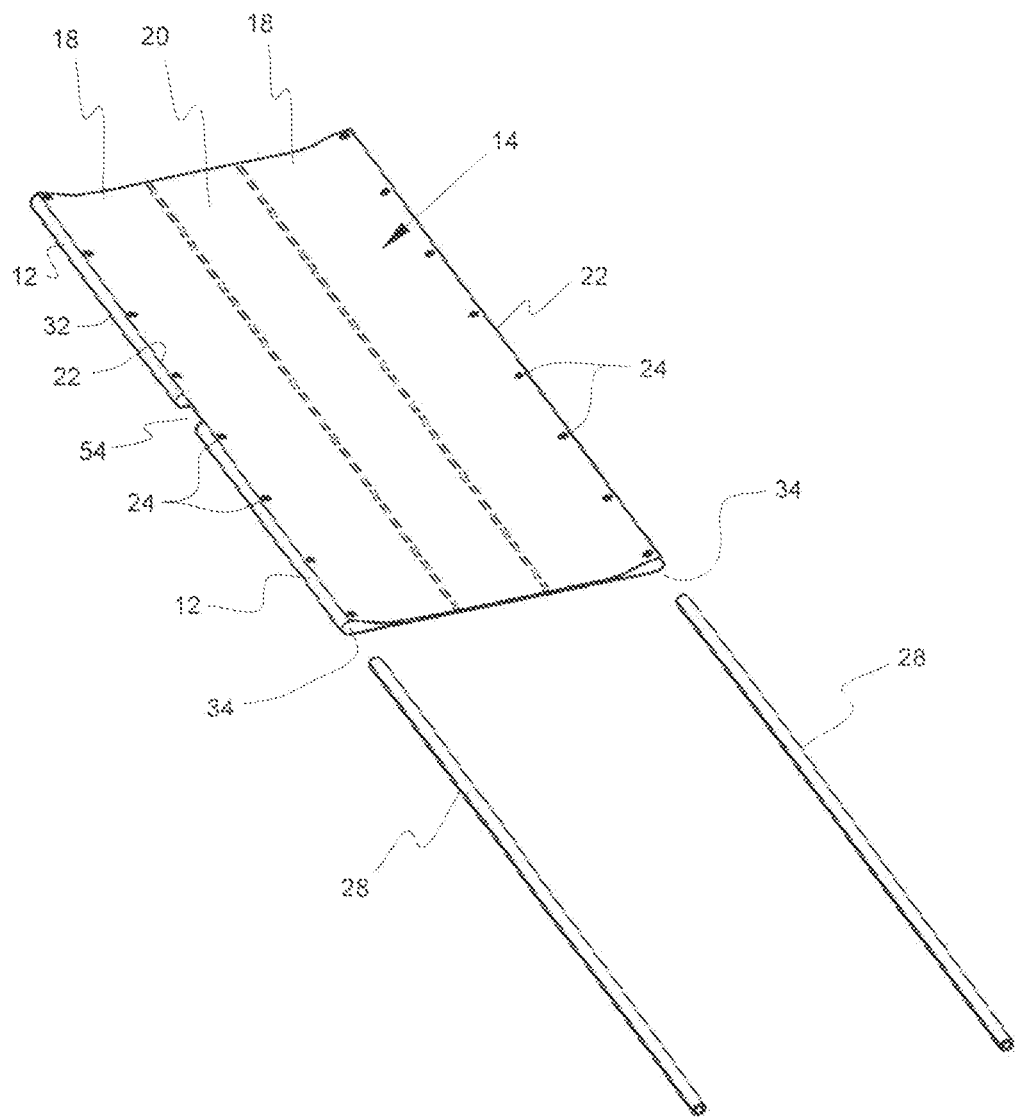
FIG. 3 is the top perspective view of FIG. 2, but with pipe members disposed proximate to pipe pouches formed in the bottom member.

Referring to the figures, a device for growing plants above a selected surface (not depicted) inside a structure or outside and exposed to the elements is denoted by numeral 10. The device 10 includes a bottom member 12 disposed upon a preselected surface (not depicted); a top member 14 disposed upon and secured to said bottom member 12 via two longitudinal securing seams 16 or lines of relatively strong twine, resulting in a top member 14 having two outer longitudinal flap portions 18 and a longitudinal center portion 20. Each of the two outer longitudinal flap portions 18 and longitudinal center portion 20 have substantially the same configuration and dimensions. The two outer longitudinal flap portions 18 are foldable for disposal above the longitudinal center portion 20, whereby, longitudinal edge portions 22 of the two outer longitudinal flap portions 18 are ultimately disposed above the longitudinal center portion; whereby, the longitudinal edge portions 22 are substantially parallel and separated a predetermined distance for allowing water and light to engage the growing material that contains preselected seeds and/or plants.

The bottom and top members 12 and 14 can be fabricated from a myriad of materials, including but not limited to polymers and canvas, but porous landscaping fabric having a relatively high tensile strength that resists tearing (well known to those of ordinary skill in the art) is the preferred material. The edge portions 22 of the flap portions 18 include a plurality of longitudinally aligned apertures 24 disposed proximate to each longitudinal edge portion 22. Flap securing members 26 for detachably securing together the longitudinal edge portions 22 of the longitudinal flap portions 18 via the apertures 24 can be fabricated from a myriad of materials including but not limited to leather, rubber, nylon and similar materials slightly "stretchable," resistant to changes in weather and with a tensile strength capable of maintaining the proximate positions of the flap portions 18 when relatively heavy plants and growing materials 40 (not part of the invention) are disposed upon the top member 14. Reinforcing rings (not depicted, but well known to those of ordinary skill) can be inserted into the apertures 24 for preventing the tearing of the longitudinal edge portions 22 of the flap portions 18 of the top member 14 when the flap securing members 26 detachably secure the longitudinal edge portions 18 together via the apertures 24.

The preferred distance separating adjacent apertures 24 in an edge portion 22 of a flap portion 18 is substantially twelve inches. The preferred distance separating cooperating apertures 24 in opposite edge portions 22 of the flap portions 18 is substantially six inches after the flap securing members 26 forcibly draw the edge portions 22 together, whereby, the open area between adjacent flap securing members 26 promotes the manual insertion of plants and/or seeds into the growing material 40. Alternatively, the plants and/or seeds can be disposed in the growing material 40 before the edge portions 22 of the flap portions 18 are forcibly drawn together by the flap securing members 26; however, the positioning of the plants and/or seeds in the growing material 40 must be between adjacent apertures 24 in an edge portion 22 of a flap portion 18, thereby preventing engagement between the flap securing members 26 and respective plants.

A pipe member 28 is removably secured to each longitudinal edge portion 30 of each longitudinal side 32 of the bottom member 12 by sliding the pipe member 28 into a pipe pouch 34 formed in the edge portion 30 by a single or double stitch of a relatively high tensile strength string 36 securing the edge portion 30 upon an inner portion 38 of the bottom member 12. The pipe member 28 promotes the manual lifting and transport of the device for disposal upon a selected surface.

A growing material 40 (not part of the device 10) such as a combination of black dirt and fertilizer, which promote the growth of the predetermined plants and/or seeds, is ultimately disposed upon the longitudinal center portion 20 of the top member 14; whereupon, the predetermined plants and/or seeds are disposed in the growing material 40. A support member 42 is detachably secured to the pipe members 28 after the predetermined plants and/or seeds are disposed in the growing material 40. The support member 42 is configured and dimensioned to detachably receive a guard member 44; whereby, the support member 42 and the guard member 44 cooperate to prevent insects and birds from engaging the plants and/or seeds disposed in the growing material 40. The support member 42 can be fabricated from steel or polymer pipe having a diameter of about one-half inch. The length of the pipe is dependent upon the longitudinal dimension of the device 10. The guard member 44 can be fabricated from weather resistant netting material, tempered glass or "greenhouse glass," but greenhouse plastic is the preferred material for preventing access to the plants and seed by insects and birds; however, the greenhouse plastic allows sunlight to engage the plants, but the netting reduces the sunlight that ultimately engages the plants.

The support member 42 includes at least two inverted, substantially "V" configured opposing pipe sections 46 that are end portions of the support member 42. The pipe sections 46 are joined together at the apex of the inverted V configuration via a lineal pipe section 48 and cooperating offset "T" configured fittings 50. The two V configured pipe sections 46 are detachably joined to each pipe member 28 via two cooperating offset "T" configured fittings 52, thereby detachably securing the support member 42 to the pipe members 28. The elevation of the lineal pipe section 48 is about two feet above the top member 14.

In the event that the distance separating the V pipe sections 46 of the support member 42 causes the guard member 44 to "sag," pipe pouch apertures 54 can be provided in the pipe pouches 34 to sufficiently expose the pipe members 28 for allowing a cooperating "C" configured clamping end of a respective cross arm portion 56 of the support member 42 to engage a respective pipe member 28. Opposite "C" configured clamping ends 57 of the cross-arm portions 56 engage the lineal pipe 48. The clamping ends 57 of the cross-arm portions 56 detachably secure to the aperture 54 exposed pipe members 28, and can also be detachably secured to a cooperating section of the lineal pipe 48. The cross-arm portions 56 reduce the distance or gap between the V configured pipe sections 46, and correspondingly reduces the sag of the guard member 44.

Figure 4:
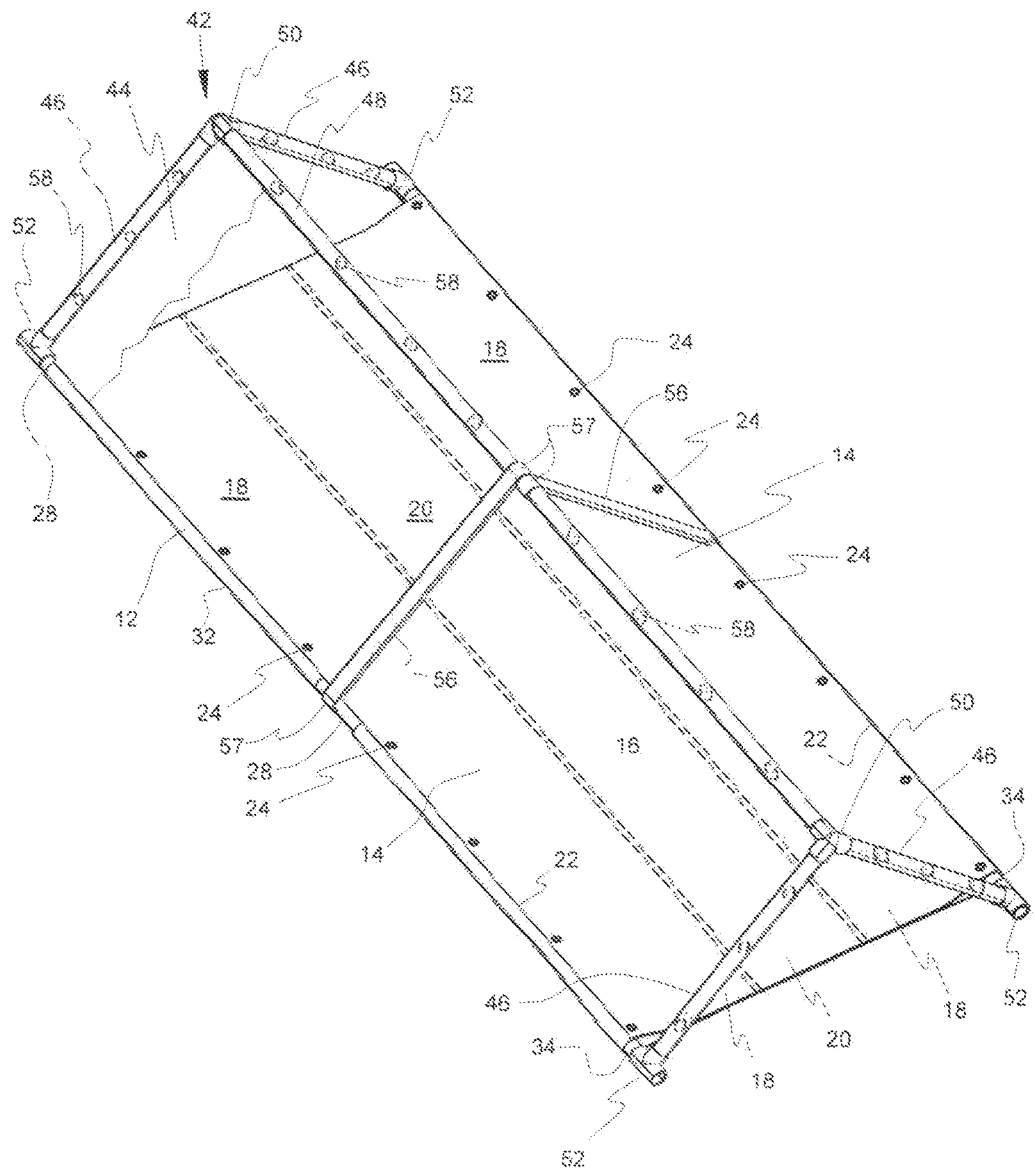
FIG. 4 is the top perspective view of FIG. 1, but without flap portions of the top member folded over growing material.
Figure 5:
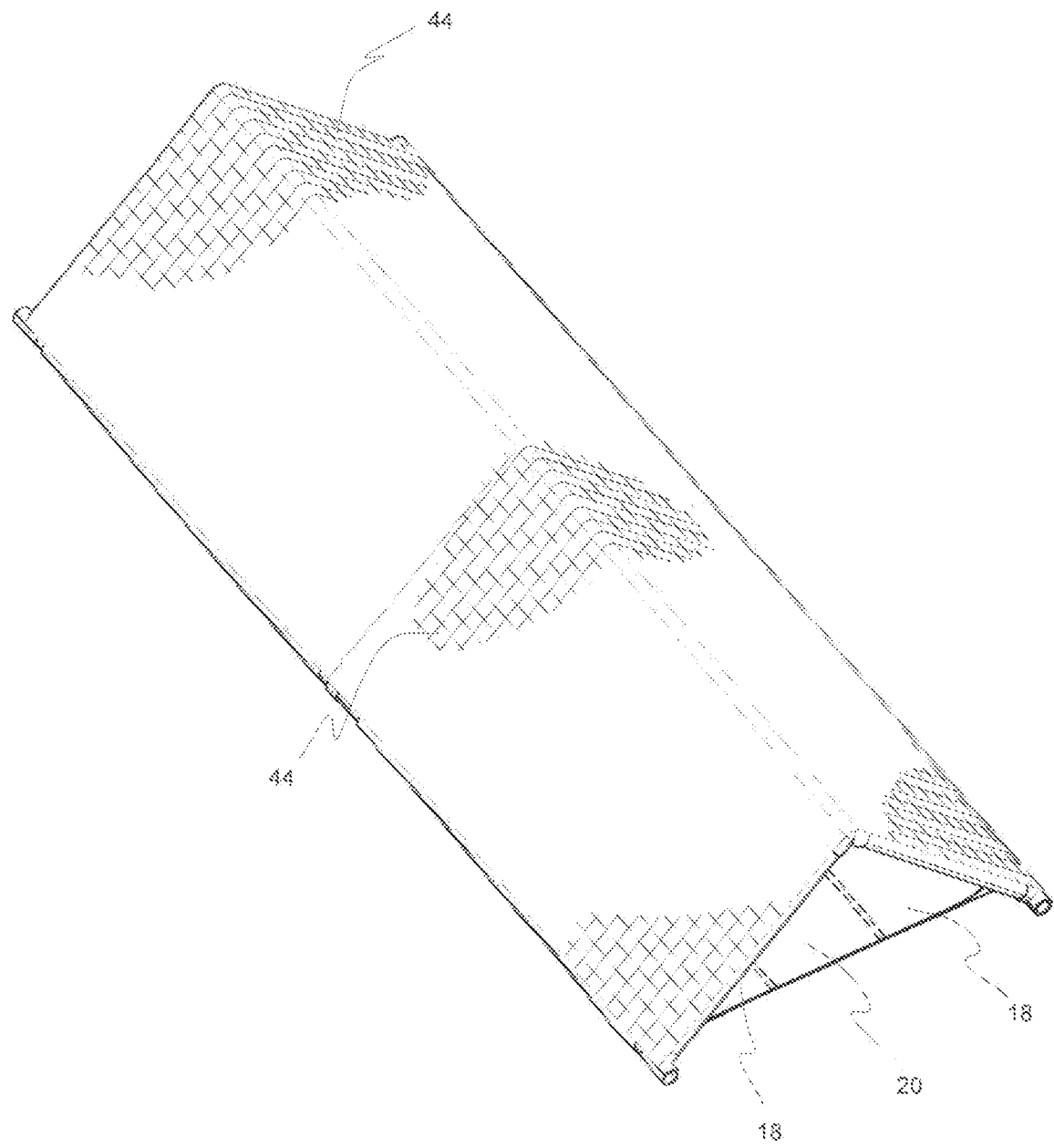
FIG. 5 is the top perspective view of FIG. 1, but with a net material covering the support structure and the top member.
Figure 6:
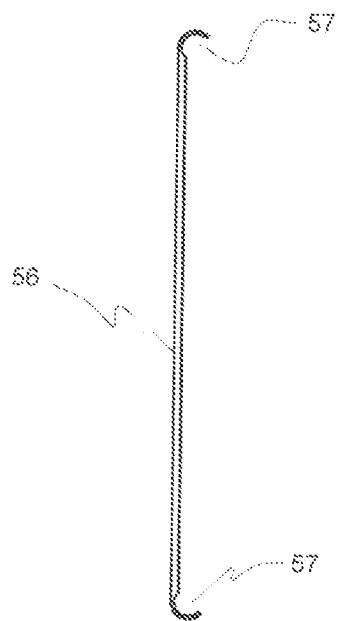
FIG. 6 is a side view of the cross-arm portion of FIG. 1.
Figure 7:
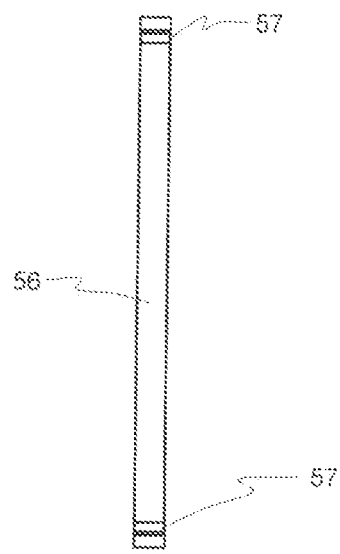
FIG. 7 is a right-side view of the cross-arm portion of FIG. 6.

Referring to FIG. 4, to moisturize the growing material 40, the two V configured pipe sections 46 and the lineal pipe section 48 of the support member 42 can include multiple water apertures 58 that direct water (having a relatively small pressure) in a generally downward direction upon the exposed growing material 40. Alternatively, water apertures 58 can be included with only the V configured pipe sections 46 or only the lineal pipe section 48. Irrespective of the location of the apertures 58 in the pipe sections 46 and 48, the apertures 58 "aim" water to intersect the longitudinal centerline of the center portion 20 of the top member 14, whereby, low water flow moistures the growing material 40 without damaging the plants in growing material 40. In the event that excessive water should flow from the openings 62 in the opposing ends formed by the folded flap portions 18 of the top member 14, a relatively small section of non-porous material (not depicted) can be stapled to a lower portion of the openings 62, whereby, a wall is formed that either prevents or restricts water flow from the folded top member 14.

In the event that the pipe members 28 need to be lengthened to promote the manual grasping of the pipe members 28 when lifting the device 10, lifting handles 60 can be added to the T fittings 52 via a pipe having a relatively short longitudinal dimension. The lifting handles 60 can be threaded to detachably receive cooperating pipe members 28 of a duplicate device 10 (the preferred longitudinal dimension for the device 10 is ten feet), thereby doubling the longitudinal dimension of the resulting device 10 to twenty feet.

In the event that the device 10 must irrigate the growing material 40 without manual oversight, a combination timer and valve member (not depicted) can be detachably secured to both a pressurized water hose (not depicted) and an end of one of the pipe members 28, thereby allowing water to flow through the water apertures 58 and upon selected portions of the growing material 40 for a predetermined time period. The combination timer and valve member can include a battery (not depicted) to power the combination when a relatively long time period of water flow is required, and/or the time period of operation must be controlled from the internet.

In operation, a user of the device 10 selects a site having a surface that the device is to be disposed upon. The surface can be inside a structure, or outside and exposed to the elements. After selecting the site and surface, the user configures and dimensions the device 10 to cooperate with the dimensions of the surface. The dimensions and configuration for the device 10 are determined by the user, but the dimensions and configuration preferred by the inventor are substantially ten feet by three feet with a rectangular configuration; however, the longitudinal dimension of the device 10 can vary from three feet to a length greater than ten feet by detachably securing together multiple ten feet sections to ultimately form a lineal row of the detachably secured sections. When the lateral dimension of the selected surface is greater than about seven feet, multiple parallel rows of the device 10 can be configured from multiple ten feet sections.

Assuming that the selected surface includes a longitudinal dimension of twenty-five feet and a lateral dimension of five feet, two devices 10 for growing plants above the selected surface could be disposed upon the surface, whereby, the two devices 10 are longitudinally joined or are separated at the discretion of the user. Each device 10 would be formed by disposing ten feet by three feet congruently secured together bottom and top members 12 and 14, whereby, only two outer longitudinal flap portions 18 and a longitudinal center portion 20 of the top member 14 are exposed. Each flap portion 18 and the longitudinal center portion 20 have a lateral dimension of substantially one foot.

A pipe member 28 slightly longer than ten feet is removably secured to each longitudinal edge portion 30 of each longitudinal side 32 of the bottom member 12 by sliding the pipe member 28 into a ten feet pipe pouch 34 formed in the edge portion 30 by a single or double stitch of a relatively high tensile strength string 36 that secures the edge portion 30 upon an inner portion 38 of the bottom member 12. The exposed ends of the pipe member 28 promote the manual lifting and transport of the device for disposal upon or from a selected surface. Alternatively, relatively short sections of pipe can be rotationally secured to the pipe members 28 to form extended handles 60 for the users.

After assembling the bottom and top members 12 and 14, and the pipe members 28, a preselected growing material 40 is disposed upon the center portion 20 in quantities that allow the two outer longitudinal flap portions 18 of the top member 14 to fold above the growing material 40, whereby, longitudinal edge portions 22 of the flap portions 18 are detachably joined, whereby, the flap portions 18 are substantially parallel and separated a predetermined distance for allowing water and light to engage the growing material 40 that contains manually added seeds and/or plants.

A support member 42 is detachably secured to the pipe members 28 after the predetermined plants and/or seeds are disposed in the growing material 40. The support member 42 is configured and dimensioned to detachably receive a guard member 44; whereby, the support member 42 and the guard member 44 cooperate to prevent insects and birds from engaging the plants and/or seeds. The guard member 44 includes cross arm portions 56 for added support for the guard member 44 in the event that the guard member "sags" between V configured pipe sections 46, and correspondingly reduces the sag of the guard member 44. The support member 42 may include multiple apertures 58 for irrigation and/or fertilizing the ground material 40 and the seeds and/or plants in the ground material 40. Water hoses (not depicted) would ultimately be detachably joined to the pipe members 28 to provide water to the support member 42, whereby, water would flow from support apertures 58 and would be directed only upon predetermined portions of the growing material 40. Water is allowed to escape a non-porous the top member 14 via end openings 62 formed via folded flap portions 18. In the event that the user needs to prevent or restrict water flow via the end openings 62, a relatively small sections of non-porous material can be stapled to a lower portion of the openings 62, whereby, a wall is formed that either prevents or restricts water flow from the folded top member 14.

The user can elevate the device 10 via handles 60 and transport and ultimately dispose one or multiple devices 10 upon the selected surface, whereby, the device 10 or multiple joined devices 10 are arranged upon the selected surface to promote growth of the seeds and/or plants in the growing material 40.

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. A device for growing plants above a selected surface comprising:
 a bottom member ultimately disposed upon a preselected surface;
 a top member disposed upon and secured to said bottom member via two longitudinal securing seams, whereby said top member includes two outer longitudinal flap portions and a longitudinal center portion, said longitudinal flap portions being foldable for disposal above said longitudinal center portion, whereby longitudinal edge portions of each longitudinal flap portions are ultimately disposed above said longitudinal center portion, whereby each of the longitudinal edge portions are separated a predetermined distance;
 a plurality of apertures disposed proximate to each of the longitudinal edge portions of said longitudinal flap portions of said top member;
 flap securing members for detachably securing together said longitudinal edge portions of said longitudinal flap portions via said apertures;
 a pipe member secured to a longitudinal edge portion of each of the longitudinal sides of said bottom member;
 a support member secured to each of said pipe members after a preselected growing material is disposed on said longitudinal center portion of said top member, after predetermined plants or seeds are disposed in the growing material, and after said longitudinal flap portions are secured together above said longitudinal center portion; and
 a guard member secured to said support member; whereby said bottom and top members and said pipe members cooperate to secure the position of the growing material upon a selected surface, and said support member and said guard member cooperate to prevent insects and birds from engaging plants or seeds disposed in the growing material.

2. The garden device of claim 1 wherein said bottom member is deformable.

3. The garden device of claim 1 wherein said top member is deformable.

4. The garden device of claim 1 wherein said apertures include reinforcing rings for preventing tearing of said longitudinal edge portions of said longitudinal flap portions of said top member when said flap securing members detachably secure said longitudinal edge portions together via said apertures.

5. The garden device of claim 1 wherein said pipe member slidably inserts into a pipe pouch formed via stitched overlap sections of said longitudinal edge portions of said longitudinal sides of said bottom member.

6. The garden device of claim 5 wherein said pipe pouch includes multiple pipe section apertures that promote an exposed pipe section of said pipe member sufficient to detachably receive a cross arm portion of said support member.

7. The garden device of claim 6 wherein said support member includes at least two upside down "V" configured pipe sections joined together at the apex of said "V" configured pipe sections via a lineal pipe section, said at least two "V" configured pipe sections being detachably joined to cooperating exposed pipe sections of each pipe member via two corresponding end portions of each of the at least two "V" configured pipe sections, thereby detachably securing said support member to said pipe members.

8. The garden device of claim 7 wherein said at least two "V" configured pipe sections and said lineal pipe section of said support member include multiple water apertures for promoting water discharge from said "V" configured and lineal pipe sections for irrigating said growing material.

9. The garden device of claim 8 wherein a combination timer and valve member are detachably secured to opposite ends of at least one of said pipe members for allowing water to flow through said water apertures for a predetermined time period for irrigating said growing material.

10. The garden device of claim 9 wherein said combination timer and valve member includes a battery.

11. The garden device of claim 7 wherein said lineal pipe section of said support member includes multiple water apertures for promoting water discharge from said lineal pipe for irrigating said growing material.

12. The garden device of claim 1 wherein said pipe members removably secured to said longitudinal edge portions of said longitudinal sides of said bottom member include lifting handles for promoting the manual lifting and transport of said device.

13. The garden device of claim 12 wherein multiple duplications of said device are detachably joined together via said lifting handles, thereby enabling said garden device to be longitudinally expanded.

14. A garden device comprising:
 a bottom member ultimately disposed upon a preselected surface;
 a top member disposed upon and secured to said bottom member via two longitudinal securing seams, whereby said top member includes two outer longitudinal flap portions and a longitudinal center portion, said longitudinal flap portions being foldable for disposal above said longitudinal center portion, whereby longitudinal edge portions of each of the longitudinal flap portions are ultimately disposed above said longitudinal center portion, whereby each of the longitudinal edge portions are separated a predetermined distance;
 a plurality of apertures disposed proximate to each longitudinal edge portion of said longitudinal flap portions of said top member;
 flap securing members for detachably securing together said longitudinal edge portions of said longitudinal flap portions via said apertures;
 a pipe member secured to a longitudinal edge portion of each of the longitudinal sides of said bottom member;
 a support member secured to each of said pipe members after a preselected growing material is disposed on said longitudinal center portion of said top member, after predetermined plants or seeds are disposed in the growing material, and after said longitudinal flap portions are secured together above said longitudinal center portion, said support member including at least two inverted "V" configured pipe sections joined together at the apex of said "V" configured pipe sections via a lineal pipe section, said at least two "V" configured pipe sections being detachably joined to cooperating exposed pipe sections of each pipe member via two corresponding end portions of each of the at least two "V" configured pipe sections, thereby detachably securing said support member to said pipe members; and a guard member secured to said support member; whereby said bottom and top members and said pipe members cooperate to secure the position of the growing material upon a selected surface, and said support member and said guard member cooperate to prevent insects and birds from engaging plants or seeds disposed in the growing material.

15. The garden device of claim 14 wherein said pipe member slidably inserts into a pipe pouch formed via stitched overlap sections of said longitudinal edge portions of said longitudinal sides of said bottom member.

16. The garden device of claim 15 wherein said pipe pouch includes multiple pipe section apertures that promote an exposed pipe section of said pipe member sufficient to detachably receive a cross arm portion of said support member.

17. The garden device of claim 16 wherein said at least two "V" configured pipe sections and said lineal pipe section of said support member include multiple water apertures for promoting water discharge from said "V" configured and lineal pipe sections for irrigating said growing material.

18. The garden device of claim 16 wherein said lineal pipe section of said support member includes multiple water apertures for promoting water discharge from said lineal pipe for irrigating said growing material.

19. A garden device for growing plants upon a predetermined surface comprising:

a bottom member disposed upon a preselected surface;

a top member disposed upon and secured to said bottom member via two longitudinal securing lines, whereby said top member includes two outer longitudinal flap portions and a longitudinal center portion, each portion having the same surface area, said longitudinal flap portions being foldable for disposal above said longitudinal center portion, whereby longitudinal edge portions of said longitudinal flap portions are ultimately disposed above said center portion, whereby said longitudinal edge portions are separated a predetermined distance;

flap securing members for detachably securing together said longitudinal edge portions of said longitudinal flap portions;

a pipe member removably secured to a longitudinal edge portion of each of the longitudinal sides of said bottom member; and a support member detachably secured to each of said pipe members after predetermined plants or seeds are disposed in a growing material disposed upon a top member, said support member configured and dimensioned to detachably receive a guard member; whereby said support member and said guard member cooperate to prevent insects and birds from engaging the plants or seeds disposed in the growing material.

20. The garden device of claim 19 wherein said longitudinal flap portions being foldable for disposal above said longitudinal center portion ultimately form openings in opposing ends of folded longitudinal flap portions of said top member, resulting in a relatively small section of non-porous material being stapled to a lower portion of said openings, whereby a wall is formed that prevents water flow from said folded top member.

* * * * *